Sept. 25, 1962 C. T. LECHER, JR 3,056,112
HIGH SPEED SHIFT REGISTER
Filed June 30, 1958
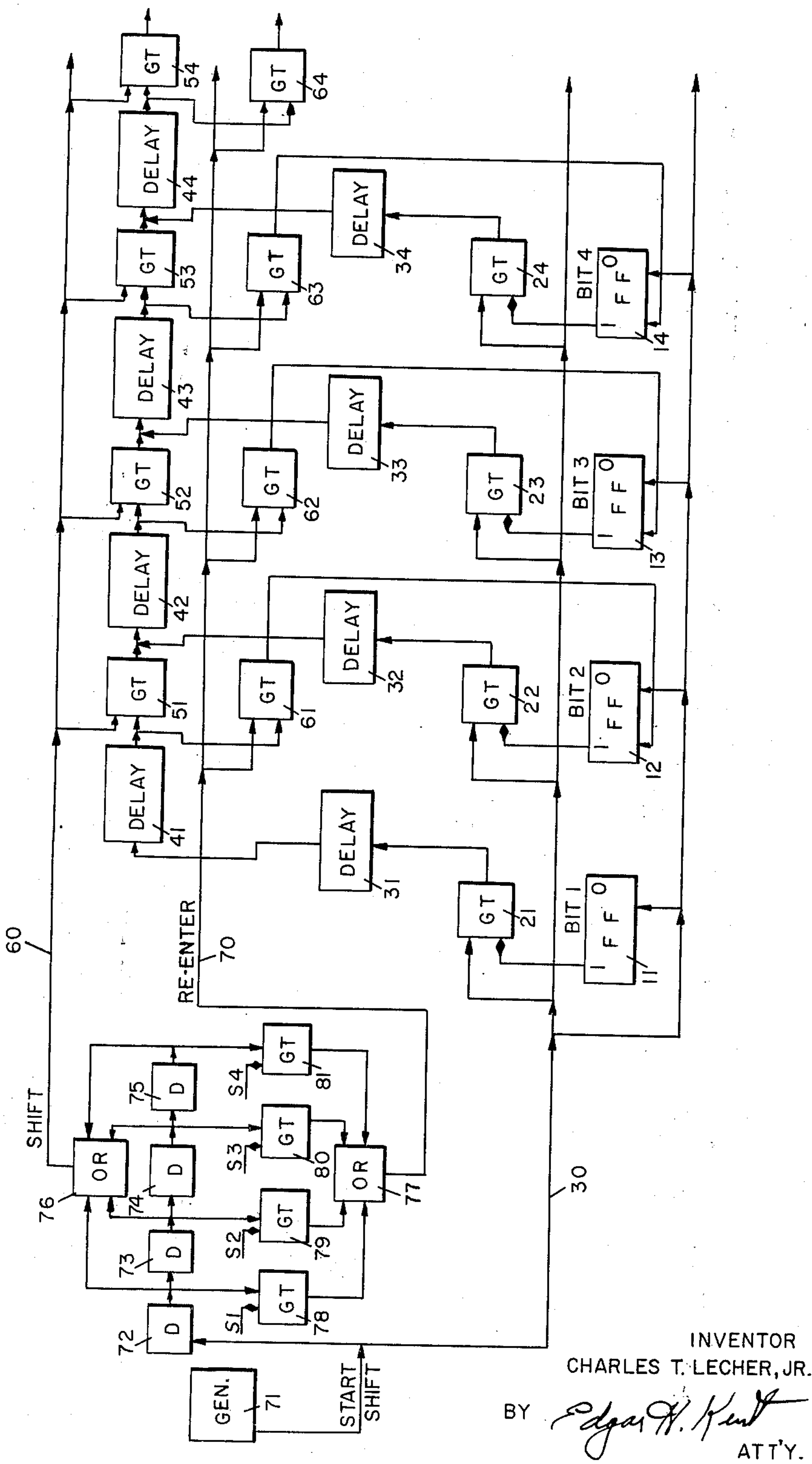
INVENTOR
CHARLES T. LECHER, JR.
BY Edgar H. Kent
ATT'Y.

3,056,112

HIGH SPEED SHIFT REGISTER

Charles T. Lecher, Jr., Saugerties, N.Y., assignor to International Business Machines Corporation, New York, N.Y., a corporation of New York Filed June 30, 1958, Ser. No. 745,535
9 Claims. (Cl. 340—173)

This invention relates to electronic data processing machines and more particularly it is concerned with a device for transferring or translating data such as a shift register.

It is an object of the invention to provide such a device that operates at very high speed.

It is another object of the invention to provide a shift register wherein a shift of any desired number of bit positions can be effected with a single shift pulse.

It is a further object of the invention to provide a shift register which is not limited in speed by the resolution time of flip-flops, at least for longer shifts of several bit positions.

It is a still further object of the invention to provide a shift register which is relatively uncomplicated and which is comprised of relatively few circuit components.

In brief, a shift register according to the present invention makes use of an articulated delay channel to transmit pulses in physically spaced relation to one another. Pulses for the delay channel are drived from a single pulse generator operating in conjunction with a group of gate circuits which are connected to the delay channel at spaced points therealong. The gate circuits are conditioned to pass a pulse from the pulse generator when corresponding stages of a storage register for the data to be shifted are in a predetermined state. Thus, the pulses applied to the delay channel may be regarded as representing the data in the storage register in serial form. The pulse from the pulse generator also serves to clear the storage register and after it has been cleared for a time determined by the length of shift desired, the pulses in the delay channel are diverted therefrom by means of another group of gate circuits. The latter gate circuits serve to apply the pulses to the register in the same sequence as they were obtained, but shifted a predetermined amount as a result of their travel down the line or channel. By means of the pulses, the register is then appropriately set to reflect the shifted data.

The delay channel is formed with a group of individual delay elements adapted to be connected in series relation to one another. Preferably another group of delay elements is employed for respective connection between the first-mentioned group of gate circuits and delay elements in order to give the register time to clear preparatory to the read-in of the shifted data.

The novel features of the invention together with further objects and advantages thereof will become more readily apparent from the following detailed description and the accompanying drawing to which it refers.

In the drawing, a block diagram of the shift register according to the present invention is illustrated wherein the lines with conventional arrowheads carry pulses and those with diamond-shaped terminations carry D.C. levels at selected times.

With reference now to the drawing, it will be observed that the register which stores the data is comprised of individual flip-flops, there having been shown four such flip-flop stages 11–14 by way of example. The flip-flops each have one and zero inputs and outputs whereby their states may be selectively controlled by pulses and separately represented by D.C. levels. Flip-flops of this general type are well known to the art and an improved version thereof especially suited for use according to the present invention may be found in patent application Serial No. 414,459, filed on March 5, 1954 for "Electronic Digital Computer" by Bernard L. Sarhan et al.

Conditioned by the respective one outputs of the flip-flops 11–14 are gate circuits 21–24 which are adapted to pass a pulse on a line 30 to individual delay elements 31–34. The delay elements 31–34 in turn are connected to a delay channel at spaced points therealong. The delay channel is formed with another group of delay elements 41–44 adapted to be connected in series relation to one another by means of gate circuits 51–54. The latter gate circuits are conditioned by a pulse on a line 60. Thus, delay element 31 is connected to the input of delay element 41; delay element 32 is connected to the input of delay element 42, and so forth. Gate circuit 51 is connected between the output of delay element 41 and the input of delay element 42, gate circuit 52 is connected between the output of delay element 42 and the input of delay element 43, and so forth.

Connected between the respective outputs of the delay elements 41–44 are gate circuits 61–64 conditioned by a pulse on a line 70. Gate circuits 61–63 feed the respective one inputs of the flip-flops 12–14. The zero inputs of the flip-flops are connected to the line 30.

To provide the pulses as aforementioned, there is a single pulse source 71 whose function it is to generate a pulse when it is desired to initiate a shift operation. Source 71 is connected to the first of a series of delay elements 72–75 having their junctions connected to an OR circuit 76. The output of OR circuit 76 is connected to the line 60. In addition to the OR circuit 76, there is an OR circuit 77 whose output is connected to the line 70. OR circuit 77 has applied thereto as inputs, pulses derived from the junctions of delay elements 72–75 which are passed selectively by means of gate circuits 78–81. Gate circuits 78–81 are conditioned selectively by a level on one of the lines S1–S4 corresponding to the desired shift order. Thus a level on line S1 for gate circuit 78 corresponds to a shift of one order, a level on line S2 for gate circuit 79 corresponds to a shift of two orders or stages, and so forth. These levels may be obtained from any convenient source since their timing is not of the essence, it being important only that the selected level be raised prior to the generation of a pulse by the source 71 to initiate a shift. This signal or pulse is applied to the line 30, as well as to the delay elements 72–75 as shown.

The delay elements 72–75 as well as elements 31–34 and 41–44 may comprise ordinary lumped LC circuits such as are well known to those skilled in the art and in common use for delay purposes. By reason of the speed capabilities of the shift register according to the present invention, however, it is preferred to use for the various gates the AND circuit disclosed in patent application No. 715,601 filed February 17, 1958 in the name of Robert M. Blake and entitled Transformer Coupled Logic. Although this circuit is described in terms of pulse inputs, exclusively, such as are applied to gates 51–54 and 61–64 herein, the circuit is equally applicable to use with a pulse input and a level such as are applied to gates 79–81.

In describing the operation of the shift register according to the present invention, a shift of one order or stage will be assumed first. To designate such a shift, a level is raised to condition gate 78 and thereafter the shift operation is initiated by the enabling of pulse source 71 to produce a pulse. The pulse is passed by those of the gate circuits 21–24 which are turned on by the flip-flops 11–14 standing in a one state, and the pulse is applied to the respective delay elements 41–44 by way of the delays 31–34. At the same time the pulse is sent directly to the zero inputs of the flip-flops 11–14 to initiate a clearing action. Still another path traversed by the pulse is through the delay element 72, the gate circuit 78, and the OR circuit 77 to the gate circuits 61–64. Since the time delay provided by element 72 is made approximately the same as the aggregate delay of element 31 and element 41, or slightly less to account for the delay in the gate circuit 78, gate 61 will be turned on when a pulse arrives at the output of delay element 41 assuming that flip-flop 11 was initially set to 1. As a consequence, the pulse is passed to the one input of flip-flop 12, the bit two flip-flop, which sets it to one. In this same way, ones derived from the bit two and three flip-flops 12 and 13 are entered into the bit three and four flip-flops 13 and 14 respectively. Thereafter, additional shift pulses caused to appear on the line 60 are of no consequence because gates 61–64 will be turned off as soon as the pulse on the line 70 terminates, which prevents any further change in the states of the flip-flops. In each case where a zero is to be shifted from one stage to the next, there will be no set one pulse transferred to the next stage with the result that that stage will be in a cleared or zero state correctly representing the effect of a zero shift.

Assuming now that it is desired to shift the contents of the flip-flop register two places or orders to the right, a level will be raised on the line S2 which conditions gate circuit 79 preparatory to the generation of a start shift pulse. Hence gate circuit 78 will not be turned on when the pulse occurs but rather gate circuit 79 will be, so that the pulse is passed to line 70 after it has traversed two delay elements 72 and 73. Prior to this time, however, there will have been produced a shift or clock pulse on the line 60 by way of delay element 72 and OR circuit 76. This clock pulse is effective to turn on the gates 51–54, momentarily, so that when each pulse in the delay channel representing a one in the register has traversed a single one of the delay elements 41–44, it will be entered in the next one of these delay elements. The result is that each pulse is caused to pass through a pair of the delay elements 41–44 before the gate circuits 61–64 are turned on by the re-enter pulse transmitted by line 70. Since this occurs in time coincidence with the arrival of each pulse at one of the gates 61–64, the pulse is passed to the one input of the flip-flop stage, two orders removed from whence it originated. Succeeding pulses on the shift line 60 are of no consequence since the gates 61–64 will be turned off, as in the case of a shift of one described previously. Likewise, all the flip-flops 11–14 are cleared by the start shift pulse on the line 30 prior to the arrival of the set pulses at the flip-flops 11–14 so that if there is to be a shift of a zero rather than one, to a particular stage, it will be reflected in the cleared state of the corresponding flip-flop. By now it will be apparent that shifts of more than two orders are effected by the raising of a level on a correspondingly higher numbered one of the lines S1–S4, and that the diagram may be extended to include an optional number of additional register stages.

Although the invention has been described in connection with a shift register, it will be readily appreciated by those skilled in the art that it might also be applied to parallel-to-series conversions of data, and vice versa. This follows from the fact that according to the invention the data stored in the register is transferred to the delay channel in the form of serial pulses which may be utilized in any way desired. Various modifications of this nature that are within the spirit and scope of the invention will, no doubt, occur to those skilled in the art and, therefore, the invention should not be deemed to be limited to what has been described in detail herein by way of example, but should be deemed to be limited only by the scope of the appended claims.

What is claimed is:

1. A shift register for binary coded data comprising a storage register having a group of bistable signal storage devices adapted to store signals representative of said data, each said storage device having first and second stable states, an articulated delay channel comprising a plurality of delay elements corresponding to storage devices of said storage register connected in series so that signals may be transmitted from one end of the channel to the other, means to enter signals from those storage devices in a first stable state into said delay channel in parallel fashion at spaced points therealong corresponding to the devices of said register from which said signals are entered, transfer means connected between said articulated delay channel and said storage register providing parallel paths for the transfer of signals from said channel to said storage register, gating means for controlling said transfer means, and timing means adapted to actuate said gating means to transfer data signals from said articulated delay chnanel to said storage register at a selected time subsequent to the time that said signals are entered therein so that the signals transmitted from the delay channel are entered in storage devices of said storage register in shifted relation relative to their original locations in the storage devices of said storage register.

2. A shift register for binary coded data comprising a storage register having a group of bistable signal storage devices adapted to store signals representative of said data, each said storage device having first and second stable states, an articulated delay channel comprising a plurality of delay elements corresponding to storage devices of said storage register connected in series so that signals may be transmitted from one end of the channel to the other, means to apply a pulse to each of those delay elements corresponding to a storage device in a first stable state, said pulses being applied to said delay channel in parallel fashion at spaced points therealong corresponding to the devices of said register in said first stable state, means to place said storage devices in the second stable state when said pulses have been applied to said delay elements, transfer means connected between said articulated delay channel and said storage register providing parallel paths for the transfer of signals from said channel to said storage register, gating means for controlling said transfer means, and timing means adapted to actuate said gating means to transfer pulses from said articulated delay channel to said storage register at a selected time subsequent to the time that said pulses were applied thereto so that all the pulses transmitted from the delay channel simultaneously place certain ones of said storage devices in the first stable state so that the signals then stored in storage devices of said storage register are in shifted relation relative to their original locations in the storage devices of said storage register.

3. A shift register for binary coded data comprising a storage register having a group of bistable signal storage register devices adapted to store signals representative of said data, each said signal storage device having first and second stable states, an articulated delay channel comprising a plurality of delay elements corresponding to storage devices of said storage register, means to interconnect said delay elements in series relation to one another so that signals may be transmitted from one end of the channel to the other, means to apply a pulse to each delay element corresponding to a storage device in a first stable state when said delay elements are connected in series relation comprising, a pulse generator and a first group of gate circuits, each gate circuit being conditioned when a respective storage device is in said first stable state to transmit a pulse derived from said pulse generator to the delay element correpsonding to the storage device in said first stable state, means to place each said storage device in the second stable state when said pulses have been applied to said delay elements, transfer means connected between said articulated delay channel and said storage register providing parallel paths for the transfer of signals from said channel to said storage register, a second group of gates for controlling said transfer means, said second group of gates being conditioned by a pulse derived from said pulse generator to transfer pulses from said articulated delay channel to said storage register at a selected time subsequent to the time that said pulses were applied thereto so that all the pulses transmitted from the delay channel via said transfer means simultaneously place certain ones of said storage device in the first stable state so that the signals then stored in said storage register are in shifted relation relative to their original locations in said storage register.

4. A shift register as claimed in claim 2 wherein said means to apply a pulse to the delay elements comprises a pulse generator and a group of gate circuits associated with said group of storage devices, each gating circuit being conditioned by the respective storage device when it is in said first state to transmit a pulse derived from said pulse generator to the delay element corresponding to that storage device.

5. A shift register as claimed in claim 3 wherein said means to interconnect said delay elements comprises still another group of gate circuits conditioned by pulses derived from said pulse generator.

6. A shift register as claimed in claim 5 wherein said storage devices comprise flip-flops each having a pair of input circuits selectively to control its state, and a pair of output circuits alternatively to provide a signal representative of its state.

7. A shift register for binary coded data comprising a storage register formed with a group of bistable devices to store the data, an articulated delay channel for the transmission of pulses from end to end thereof, means to read out the data in parallel fashion from said storage register and enter it in said delay channel in the form of pulses at spaced points therealong, means to produce a train of clock pulses, and means to transmit the data pulses from said delay channel in parallel fashion to the respective bistable devices in response to a selected one of said clock pulses thereby to re-enter the data in said storage register.

8. A shift register for binary coded data comprising a storage register formed with a group of bistable devices adapted to store the data, an articulated delay channel formed with a group of delay elements adapted to transmit pulses, means to read out the data in parallel fashion from said storage register and to enter it into said delay channel in the form of pulses applied to selected delay elements, means to produce a train of clock pulses, means momentarily to connect said delay elements in series relation to one another in response to successive ones of the clock pulses, and means to transmit the data pulses from the delay elements in parallel fashion to the respective bistable devices in response to a selected one of said clock pulses, thereby to re-enter the data in said storage register.

9. Transfer apparatus for coded data comprising a storage register having a plurality of stages adapted to store signals representative of said coded data, an articulated delay channel comprising a plurality of delay elements corresponding to the stages in said storage register and connected in series so that signals may be transmitted from one end of the channel to the other, means to enter signals from stages of said register into said delay channel in parallel fashion at spaced points therealong corresponding to the stages of said register from which said signals are entered, transfer means connected to said articulated delay channel providing parallel paths for the transfer of signals from said channel, gating means for controlling said transfer means, and timing means adapted to actuate said gating means to transfer data signals in parallel from said articulated delay channel at a selected time subsequent to the time that said signals were entered therein so that the signals transmitted from the delay channel are in shifted relation relative to their original locations in the stages of said storage register.

References Cited in the file of this patent

UNITED STATES PATENTS

| | | |
|---|---|---|
| 2,652,501 | Wilson | Sept. 13, 1953 |
| 2,700,504 | Thomas | Jan. 25, 1955 |
| 2,711,526 | Gloess | June 21, 1955 |
| 2,715,678 | Barney | Aug. 16, 1955 |
| 2,787,416 | Hansen | Apr. 2, 1957 |
| 2,790,599 | Gloess | Apr. 30, 1957 |
| 2,840,708 | Sandiford | June 24, 1958 |
| 2,872,663 | Kelner et al. | Feb. 3, 1959 |
| 2,925,218 | Robinson et al. | Feb. 16, 1960 |

OTHER REFERENCES

"Arithmetic Operations in Digital Computers," R. Richards, Van Nostrand Co., 1955, pp. 144–148.